Figure 1:
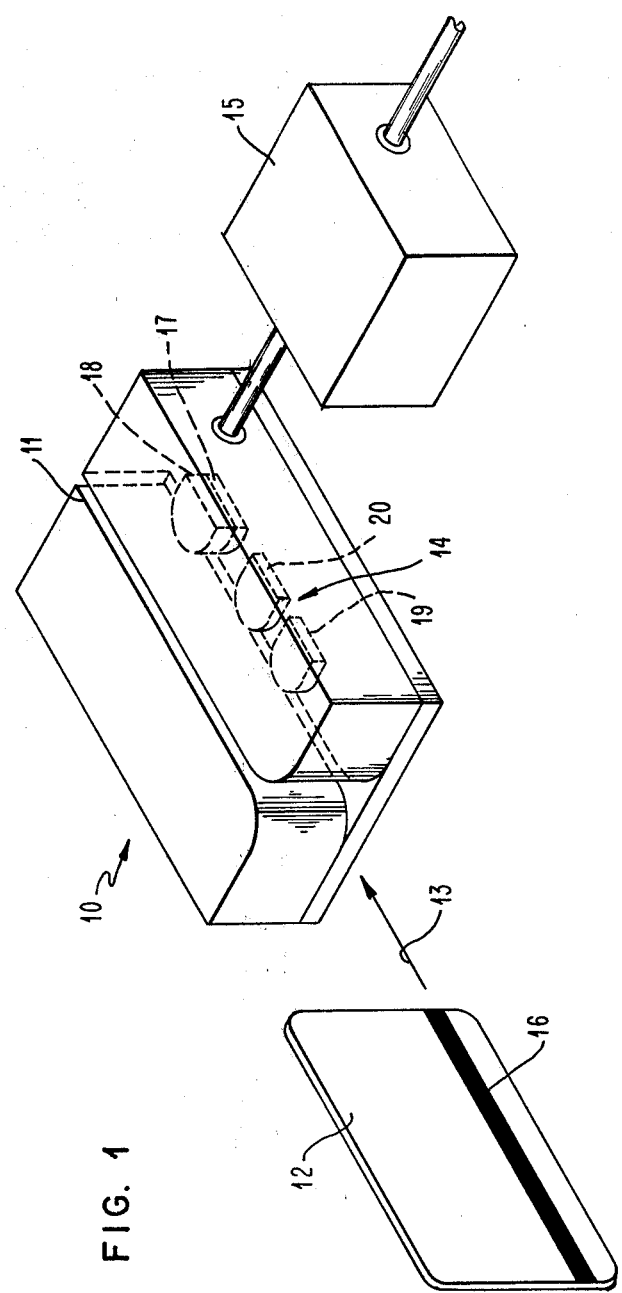

United States Patent [19]

Double

[11] 4,345,278
[45] Aug. 17, 1982

[54] ACCELERATION CORRECTION FOR SELF-CLOCKING WRITE-HEAD

[75] Inventor: Glen P. Double, Charlotte, N.C.

[73] Assignee: International Business Machines Corporation, Armonk, N.Y.

[21] Appl. No.: 214,318

[22] Filed: Dec. 8, 1980

[51] Int. Cl.³ .................. G11B 25/04; G11B 15/18
[52] U.S. Cl. ............................ 360/2; 235/474; 235/476; 235/482; 360/73
[58] Field of Search ............ 360/2, 51, 73; 235/436, 235/474, 476, 482

[56] References Cited

U.S. PATENT DOCUMENTS

| | | | |
|---|---|---|---|
| 3,172,091 | 3/1965 | Friend | 340/174.1 |
| 3,272,969 | 9/1966 | Cutaia | 235/61.11 |
| 3,439,354 | 4/1969 | Behr et al. | 340/174.1 |
| 3,914,789 | 10/1975 | Coker, Jr. et al. | 360/2 |
| 4,264,934 | 4/1981 | Mattes | 360/2 |

OTHER PUBLICATIONS

M. G. Wilson, "System for Varying Oscillator Frequency", IBM Technical Disclosure Bulletin, vol. 5, No. 11, Apr. 1963.

L. D. Larsen, "Variable Compensation for Acceleration in Hand-Scanned Codes", IBM Technical Disclosure Bulletin, vol. 19, No. 7, Dec. 1976.

Primary Examiner—Vincent P. Canney
Attorney, Agent, or Firm—E. Ronald Coffman

[57] ABSTRACT

A time base signal for controlling the recording of binary data is developed by measuring the velocity of a magnetic record. The velocity is measured by determining an average velocity by the time interval required for a mark recorded by a write head to move a predetermined distance to a read head and correcting the average velocity as a function of the acceleration of the record. The acceleration is determined by recording a reference frequency pattern at a first station, reading the pattern at a second station, and measuring the difference between the written and read patterns.

8 Claims, 3 Drawing Figures

ACCELERATION CORRECTION FOR SELF-CLOCKING WRITE-HEAD

Reference is made to patent applications, Ser. Nos. 214,317 and 214,319 filed simultaneously herewith, which pertain to related subject matter and are commonly assigned herewith.

The use of magnetic stripe cards for computer data entry has become increasingly popular in recent years. A variety of data entry applications provide simply a slot through which a magnetic stripe card can be moved by hand. The magnetic record, itself, typically follows a self-clocking protocol by which the form of the recorded bit pattern provides a time base reference for its own interpretation. With such a protocol, it is possible to read pre-recorded data with little constraint on the scanning speed. To write data with equal facility, however, it is necessary to supply an external control to cause the spacing between recorded bits to follow certain standards and thereby assure that the data can be subsequently read. This is especially true where the data is to be recorded in a self-clocking protocol.

One approach to the accurate recording of data bits is shown in U.S. Pat. No. 3,914,789. This patent shows a somewhat bulky optical emitter that follows, through mechanical connection, the movement of the card to generate clock pulses in direct synchronism with the card movement.

Another technique which is commonly used in a variety of data processing environments for producing clocking pulses, employs a pre-recorded clock reference track that is read from the record during the time that data is being recorded on the primary data track or tracks of the record. This approach, while technically satisfactory as to accuracy and the avoidance of mechanical moving parts, is not compatible with the existing magnetic stripe card products which make no provision for a separate clock reference track.

An object of my invention has been to provide a compact magnetic stripe encoder for recording self-clocking data tracks on a card with a minimum constraint on card movement.

Another object of my invention has been to provide a hand-operated magnetic stripe encoder having substantially no moving parts.

A further object of my invention has been to provide a hand-operated magnetic stripe encoder that is operable upon magnetic stripe cards which are completely compatible with other existing magnetic card readers and encoders.

A still further object of my invention has been to provide a hand-operated magnetic stripe encoder of a mechanical simple design having a high tolerance for operator speed variation so as to provide for successful encoding by untrained personnel in a wide variety of applications.

SUMMARY OF THE INVENTION

These objects of my invention are accomplished by providing apparatus that electronically senses the relative velocity of the card during encoding. The velocity is then employed to control the delivery of clock and data bits to the recording or encoding device such that the bits are recorded at a fixed bit density on the stripe in accordance with a self-clocking protocol regardless of the velocity, or variations in the velocity, at which the card is moved past the encoding station.

The particular velocity measuring technique of my invention provides for determining the average velocity of a record card by measuring the time required for it to transverse a premeasured distance, and also determining the average acceleration experienced by the card by measuring the relative change in a frequency pattern read from the card with respect to that written thereon. A correction factor is computed from the acceleration determined. This correction factor, when added to the determined average velocity, produces a representation of instantaneous card velocity. An output is created from the computed instantaneous velocity for controlling the time interval between adjacent recorded bits. The instantaneous velocity is updated at frequent intervals by adding fixed velocity increments computed from the measured acceleration. At less frequent intervals, the acceleration measurement is itself redone. For longer records, the entire process can be repeated.

In the preferred embodiment of my invention, a pattern of regular flux transitions is recorded by a magnetic write head positioned a predetermined distance D upstream of a magnetic read head. A first counter accumulates a number count that measures the time required for the first flux transition to travel from the write head to the read head. Average velocity can be computed directly from this travel time count. As the pattern passes the read head, a second counter measures the flux transition frequency with respect to the frequency at which transitions of the pattern were originally supplied to the write head. Average acceleration can be computed from the contents of the two counters. Thus an initial instantaneous velocity is determined, based on the input of the two counters. Periodic updates are made as described above. When it is desired to repeat the entire process to minimize progressive accumulation of error, the frequency pattern is terminated for a period of time to create a recognizable first transition to control the first counter.

Conveniently, the velocity-measuring pattern can be recorded on the same track as the data being recorded. Thus the final data is written over the velocity-measuring patterns which, once measured, are of no further value. Since my invention provides for the correction of an average velocity measurement by taking into account the change in velocity occurring during the interval that average velocity was being measured, it is possible to accommodate a wide range of practical hand-scanning speeds and individual styles.

Figure 3:
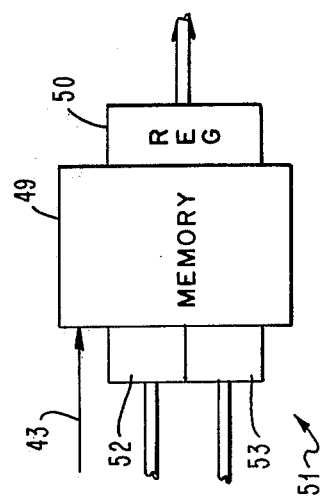
Figure 2:
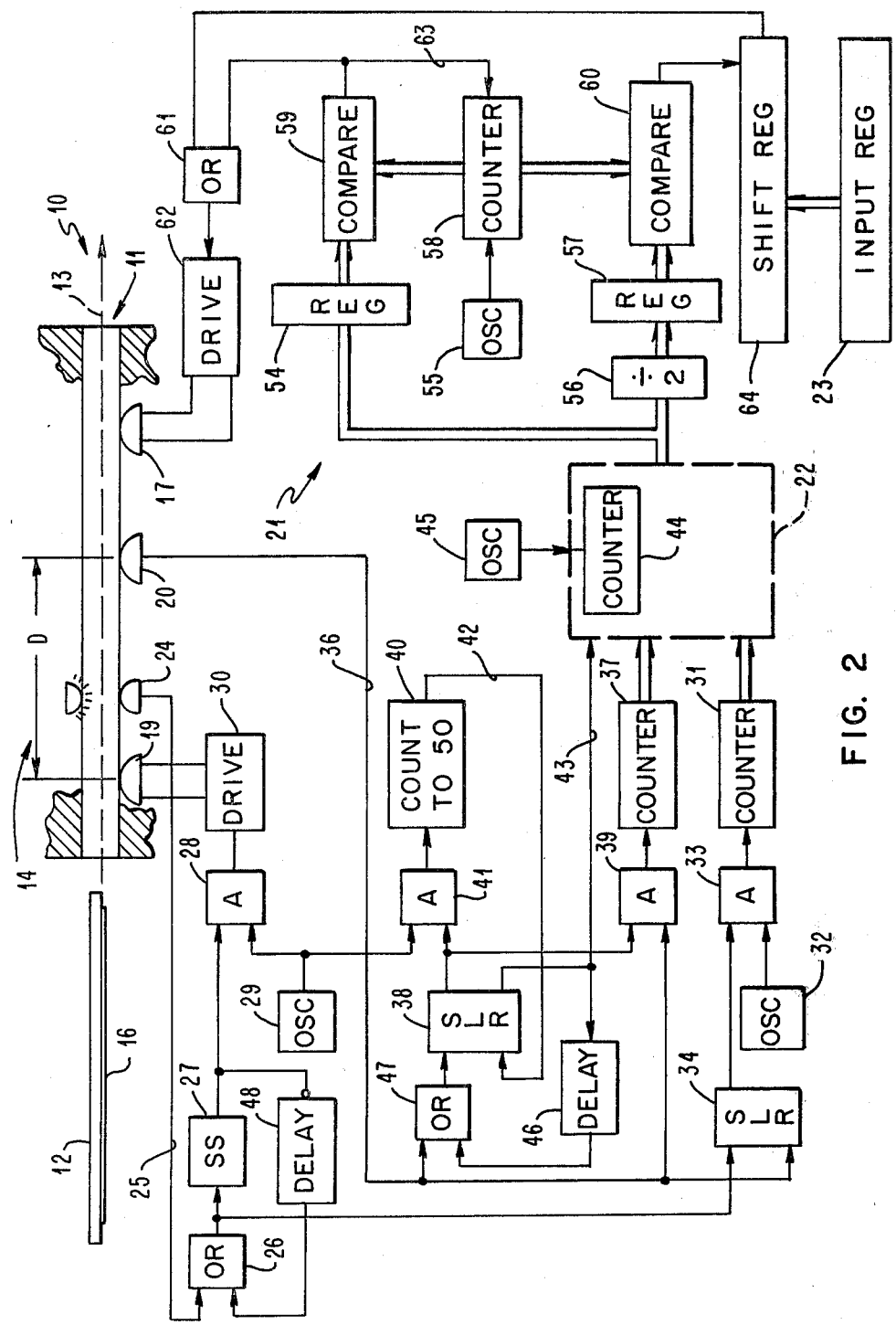

These and other objects, features and advantages of my invention will be apparent to those skilled in the art from reading the following description of a preferred embodiment of my invention wherein reference is made to the accompanying drawings, of which:

FIG. 1 is a perspective, partly broken-away view of a magnetic stripe encoder, constructed in accordance with my invention, FIG. 2 is a major function diagram of circuitry illustrating the preferred embodiment of my invention, and FIG. 3 is a diagram showing an alternate implementation of computational circuitry used in the circuitry of FIG. 2.

Referring more specifically to FIG. 1, there is shown an encoder or recording station 10, having a slot 11 therein, through which a magnetic record form, such as magnetic stripe card 12, can be moved by hand along path 13. A transducer assembly 14, within the encoder 10, operates to record data, supplied from a source (not shown), through the control circuitry in control unit 15 onto the magnetic stripe 16 of the card 12. In the preferred embodiment of my invention, transducer assembly 14 comprises one or more parallel track data recording or encoding heads 17, 18, positioned downstream of a writing head 79 and a reading head 20 which operate to measure the velocity of the card 12 as it passes through slot 11. Only one pair of velocity measuring heads 19 and 20 are required, regardless of the number of recording heads 17, 18 employed.

Each of the recording heads 17, 18, etc. is connected to "write" control circuitry 21, FIG. 2, which interrelates a time base control derived from velocity computing circuitry 22 with data supplied to data register 23 for writing binary data on the stripe 16.

The transducer assembly 14 is shown in somewhat diagramatic form in FIG. 2, and consists of the write head or device 19, the read head or device 20 spaced downstream of the write head 19 by a distance D, and the encoding or data recording heads 17, 18. An edge detector 24, which can conveniently be a light and photocell pair, is provided to detect the edge of card 12 as it moves into slot 11.

As card 12 enters slot 11, it is necessary to remove by well known erase means, not shown, any prerecorded marks on the magnetic stripe that would interfere with the measurement. Measurement begins by recording a frequency reference pattern onto the stripe 16 when the leading edge of the card 12 is sensed by edge detector 24. A signal on line 25 passes through OR circuit 26 to activate a single shot circuit 27. A square wave output, having a predetermined duration, is directed to AND gate 28 to control the number of pulses from reference pattern oscillator 29 which generates the reference frequency signal pattern that is applied to the writing head 19 through driver circuit 30. A satisfactory frequency for oscillator 29 is in the neighborhood of 5 KHz which will provide the resolution necessary to accommodate variations in hand speed between 4 and 40 inches per second and accelerations of up to 100 inches/sec$^2$. A reference frequency pattern of flux transitions is thus recorded on stripe 16 by head 19.

Counter 31 is provided to measure the time required for the first of the flux transitions recorded on stripe 16 to transverse the distance D between write head 19 and read head 20. Pulses are supplied to counter 31 from 10 KHz oscillator 32 under the control of AND gate 33 and bistable latch 34. Latch 34 is set by the leading edge of the output of OR circuit 35 to gate pulses from oscillator 32 through AND gate 33 into counter 31, beginning in substantial synchronism with the recording of the first transition by head 19.

Counter 31 continues to receive pulses from oscillator 32 as card 12 moves along path 13 until the first of the transitions recorded on stripe 16 reaches the read head 20 after card 12 has traversed distance D. Read head 20, upon perceiving the first transition, provides a derived signal on line 36 that resets latch 34, thereby terminating the supply of pulses to counter 31.

The changed frequency of pulses due to acceleration, is monitored by read head 20 and measured by counter 37. The first pulse applied to line 36 sets bistable latch 38 to gate subsequent pulses on line 36 through AND gate 39 to counter 37. Latch 38 also gates pulses from the 5 KHz reference pattern oscillator 29 to a count-to-fifty circuit 40 through AND gate 41.

When circuit 40 has counted 50 pulses of oscillator 29, an output on line 42 resets latch 38 to terminate counting by counter 37. Reset of latch 38 also applies a pulse on control line 43, to cause the counts in counter 31 and 37 to be transferred to computational circuitry 22 and to initiate a computational cycle of circuitry 22.

The details of computational circuitry 22 form no part of my invention inasmuch as there exists a variety of well known techniques for accomplishing the necessary mathematic calculation. For example, a microprocessor can be employed which is programmed to compute $$Vi = D/K_1 C_T + (\tfrac{1}{2}) a K_1 C_T$$

where

Vi is the initial velocity computed $K_1$ is a constant of proportionality to change counts from counter 31 to time-of-travel D is the distance between heads 19 and 20

$C_T$ is the count accumulated in counter 31, and a is the acceleration as determined by the function $$A = [D/2K_1^2 C_T^2][1 - (50/C_f)^2]$$

where, in addition to the above, $C_f$ is the count accumulated in counter 37 during 50 counts from reference oscillator 29. $C_f$ represents the frequency read at head 20.

Alternatively, pre-wired computational logic, arranged to provide only this computation, can be employed.

The initial velocity, thus computed, remains accurate only in the unlikely circumstance that the velocity remains constant. To more completely account for the presence of acceleration, I provide three levels of updating the computed velocity.

First, I find it accurate to assume that the acceleration computed from counter 37 will remain relatively constant for short periods of time. Based on this assumption, an update velocity Vn is determined by computing Vn=Vi+ΔV at regular intervals t. To this end, circuitry 22 includes a counter 44 which continuously receives pulses from a time base source such as oscillator 45. Starting with the completion of the computation of Vi, circuitry 22 acts automatically at each occurrence of a predetermined number of additional counts in counter 44 to compute ΔV, where ΔV=at. The time factor t is a function of the number of counts selected plus a small fixed increment to account for computational time.

The second updating technique that I employ provides for re-measuring the acceleration through counter 37. Thus, the reset pulse on line 43 is supplied through delay 46 and OR circuit 47 to again set bistable latch 38 and initiate a new counting operation of counter 37. When counter 40 reaches 50, latch 38 is again reset and an output on line 43 causes transfer of the count from counter 37 to circuitry 22 and a computation of a new acceleration to be used in subsequent updating, as described immediately above.

For records longer than two inches in length, I prefer also to provide a third update arrangement that effectively re-performs the entire measurement of initial velocity. The interval for remeasurement is determined by single shot 27 and inverting delay 48 which respectively control the number of transitions in the series supplied write head 19 and the duration of a quiescent period separating one such series from the next. In the rather simple embodiment shown herein, the quiescent period should be longer than the time required for a point on a card 12 to travel distance D to avoid confusing the operation of counter 31.

Rather than direct calculation of the function Vi, it is also within the skill of the art to store in table look-up memory the precalculated results of such computations at addresses which respond directly to the counts accumulated in counters 31 and 37.

As an illustrative example, FIG. 3 shows such an arrangement, including a memory 49 having an output register 50 and an input or address register 51 which is divided into sections 52 and 53. The memory 49 contains a large number of data word storage locations which are each accessible by the combined address in register 51. The data word stored at each of the addresses is a precalculated number representing the value of Vi based on the numerical value of the counters 31 and 37 which are respectively supplied to address register sections 52 and 53. Accordingly, when the calculation is to be performed, the variable data collected in counters 31 and 37 simply addresses the precalculated answer in memory 49 and presents it to output register 50.

Write control circuitry 21 takes the results of the velocity calculations and provides time base pulses at a rate necessary to cause flux transitions recorded on magnetic stripe 16 to be spaced in accordance with a prescribed standard. One convenient self-clocking format requires a spacing between successive recorded clock pulses to be 0.02 inches. Data is represented in this format by the presence or absence of an additional transition recorded half-way between successive clock pulses. The distance between a clock transition and a successive data transition thus would be 0.01 inches.

Through whichever means the computations are effected, computational circuitry 22 supplies the results to output register 54 in the form of a time base control number that is equal to the number of pulses of 150 KHz oscillator 55 required to measure the distance of 0.02 inches between successive to-be-recorded clock pulses. The time base control number is also supplied through divide-by-two circuit 56 to register 57. Thus the contents of register 57 equals the number of pulses from oscillator 55 required to measure the distance of 0.01 inches between a clock transition and a subsequent data transition.

Oscillator 55 continuously delivers pulses to counter 58 even during non-recording or idle conditions. Counter 58 counts to a fixed number, such as 512, and returns automatically to 0. The content of counter 58 is applied to compare circuits 59 and 60. An output will be produced by either compare circuit 59 or 60 when it receives from counter 58 the number applied by logic 22 to register 54 or 55, respectively.

The output of circuit 59 is applied to control the writing of clock pulses by write head 17 through OR circuit 61 and driver circuit 62. This output also acts through line 63 to reset counter 58A to its 0 or start condition.

The output of circuit 60 is applied to gate a data bit out of shift register 64 to OR circuit 61. Since thr protocol for the code to be recorded calls for a series of clock bits initially, shift register 64 will be initially loaded with a series of 0's so that the first recording by write head 17 will be simply clock bits. Shift register 64 is thereafter loaded from a data input register 23 with the actual pattern of 1's and 0's to be recorded.

Driver circuit 62 responds to each input pulse by changing the direction of current supply to write head 17, either upon the receipt of a clock bit from compare circuit 59 or a data bit if a "1" is gated from shift register 64.

Those skilled in the art will recognize that while a specific illustrative embodiment of my invention has been disclosed, various modifications and alternatives to this embodiment can be made by those skilled in the art without departing from the principles of my invention. In particular, it is possible for the transducing assembly 14 to be mounted on a hand-held device, such that the transducing head is moved manually past a stationary record form. Furthermore, the circuitry shown and particular reference patterns described can be varied as required to meet ordinary speed, cost and reliability for a particular implementation. Accordingly, the scope of my invention is intended to be limited only by the language of the appended claims.

I claim:

1. In magnetic recording apparatus wherein a magnetic record form and a transducing assembly are moved relatively, one with respect to the other, along a path and wherein the apparatus includes control circuitry responsive to a time base signal and a data signal for controlling the recording of data on said record form, and including magnetic recording means, magnetic reading means aligned with said recording means along said path and spaced downstream therefrom in relation to the direction of said relative movement, and means for measuring the time interval required for a point on the record form to traverse a predetermined distance, the improvement comprising, in combination:

means for delivering a frequency reference signal to said recording means to record a representation thereof on said record form, frequency measuring means responsive to signals derived by said reading means from said recorded representation of said frequency reference signal for measuring the frequency thereof, and means responsive to said time interval measuring means and said frequency measuring means for producing a time base signal for said control circuitry defining predetermined increments of displacement of the magnetic record form with respect to said transducing assembly.

2. Magnetic recording apparatus as defined in claim 1, wherein said frequency measuring means further comprises means responsive to said frequency reference signal delivering means.

3. Magnetic recording apparatus as defined in claim 1, wherein the improvement further comprises means operative at intervals for modifying said time base signal as a function of the passage of time.

4. Magnetic recording apparatus as defined in claim 1, wherein the improvement further comprises means operable at intervals for re-initiating operation of said frequency measuring means.

5. Magnetic recording apparatus as defined in claim 1, wherein the improvement further comprises means operable at intervals for re-initiating the operation of said time interval measuring means and said frequency measuring means.

6. Magnetic recording apparatus as defined in claim 1, wherein said time interval measuring means comprises means for measuring the time interval between the recording of a portion of said frequency reference signal and the reading by said reading means of said frequency reference signal portion.

7. Magnetic recording apparatus as defined in claim 1, further comprising guide means for directing said magnetic record form for manual movement along said path.

8. Magnetic recording apparatus as defined in claim 1, wherein the recorded representation of said reference signal is a series of spaced magnetic flux transitions.

* * * * *